(12) United States Patent
Layton

(10) Patent No.: US 9,229,593 B2
(45) Date of Patent: Jan. 5, 2016

(54) SINGLE AND MULTIPLE FINGER EXTRACTION AND POSITION CALCULATION USING A WEIGHTED MASK

(71) Applicant: CIRQUE CORPORATION, Salt Lake City, UT (US)

(72) Inventor: Michael D. Layton, Salt Lake City, UT (US)

(73) Assignee: CIRQUE CORPORATION, Salt Lake City, UT (US)

( * ) Notice: Subject to any disclaimer, the term of this patent is extended or adjusted under 35 U.S.C. 154(b) by 219 days.

(21) Appl. No.: 13/852,673

(22) Filed: Mar. 28, 2013

(65) Prior Publication Data

US 2013/0257803 A1   Oct. 3, 2013

Related U.S. Application Data

(60) Provisional application No. 61/616,762, filed on Mar. 28, 2012.

(51) Int. Cl.
*G06F 3/041* (2006.01)
*G06F 3/044* (2006.01)

(52) U.S. Cl.
CPC .............. *G06F 3/044* (2013.01); *G06F 3/0416* (2013.01)

(58) Field of Classification Search
CPC ....... G06F 3/041; G06F 3/044; G06F 3/0414; G06F 3/0436; G06F 3/04883; G06F 17/50; G06F 19/3456; G06F 3/0346; G06F 3/0416; G06F 11/0793; G06F 11/10; G06F 15/18; G06F 17/00; G06F 17/18; G06F 17/02
USPC .................................................. 345/143–175
See application file for complete search history.

(56) References Cited

U.S. PATENT DOCUMENTS

| | | |
|---|---|---|
| 2009/0021489 A1 | 1/2009 | Westerman |
| 2009/0284495 A1 | 11/2009 | Geaghan |
| 2010/0045632 A1 | 2/2010 | Yilmaz |
| 2010/0060609 A1 | 3/2010 | Doi |
| 2011/0025638 A1 | 2/2011 | Salaverry |
| 2012/0062474 A1 | 3/2012 | Weishaupt |
| 2012/0287055 A1* | 11/2012 | Cheng ........................... 345/173 |

OTHER PUBLICATIONS

Applicant's Admitted Prior Art, specifcation pp. 1-5, Figures 1-4.*

* cited by examiner

*Primary Examiner* — Duc Dinh
(74) *Attorney, Agent, or Firm* — Morriss O'Bryant Compagni, PC

(57) ABSTRACT

A method for single and multi-finger extraction and position calculation using weighted masks for each finger, the masks for each finger being calculated using the previous position of each finger, and when the measured results overlap, the results are apportioned according to the masks such that each position result is scaled according to its mask, and scaled by its mask divided by the sum of all overlapping masks.

13 Claims, 13 Drawing Sheets

WEIGHTED AVERAGE CALCULATION (ONE DIMENSIONAL)

| index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| results | 0 | 0 | 0 | 2 | 4 | 5 | 4 | 2 | 1 | 0 | 0 | 0 | 0 | 0 | 0 | 0 |

X POSITION  sum of sums
                    18 column
5.166666667         93 position weights applied to above
                    0 | 0 | 0 | 6 | 16 | 25 | 24 | 14 | 8 | 0 | 0 | 0 | 0 | 0 | 0 | 0 weghted average calculation extracts position from finger strength by applying distance from origin

CREATION OF COSINE SQUARED MASK USING POSITION ESTIMATE FROM ABOVE

4  1.5707963

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| distance | 5.1666667 | 4.1666667 | 3.1666667 | 2.1666667 | 1.1666667 | 0.1666667 | 0.8333333 | 1.8333333 | 2.8333333 | 3.8333333 | 4.8333333 | 5.8333333 | 6.8333333 | 7.8333333 | 8.8333333 | 9.8333333 |
| clipped | 4 | 4 | 3.1666667 | 2.1666667 | 1.1666667 | 0.1666667 | 0.8333333 | 1.8333333 | 2.8333333 | 3.8333333 | 4 | 4 | 4 | 4 | 4 | 4 |
| scaled | 1.5707963 | 1.5707963 | 1.2435471 | 0.850848 | 0.4581489 | 0.0654498 | 0.3272492 | 0.7199483 | 1.1126474 | 1.5053465 | 1.5707963 | 1.5707963 | 1.5707963 | 1.5707963 | 1.5707963 | 1.5707963 |
| cos^2 | 3.752E-33 | 3.752E-33 | 0.1033233 | 0.4347369 | 0.8043807 | 0.9957224 | 0.8966767 | 0.5652631 | 0.1956193 | 0.0042776 | 3.752E-33 | 3.752E-33 | 3.752E-33 | 3.752E-33 | 3.752E-33 | 3.752E-33 |
| rounded | 0 | 0 | 0.103 | 0.435 | 0.804 | 0.996 | 0.897 | 0.565 | 0.196 | 0.004 | 0 | 0 | 0 | 0 | 0 | 0 |

13.97846098 cos^2 weighted result column
71.37045134 position weights applied to above

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | 0 | 0 | 0 | 0.8694738 | 3.2175229 | 4.9786122 | 3.5867067 | 1.1305262 | 0.1956193 | 0 | 0 | 0 | 0 | 0 | 0 | 0 |
| | 0 | 0 | 0 | 2.6084214 | 12.870091 | 24.893061 | 21.52024 | 7.9136833 | 1.5649543 | | | | | | | |

5.105744577 single finger calculated using weighted average one dimension
single finger mask applied

SINGLE AND MULTIPLE FINGER EXTRACTION AND POSITION CALCULATION USING A WEIGHTED MASK

BACKGROUND OF THE INVENTION

1. Field of the Invention

This invention relates generally to touch sensors including touchpads and touchscreens. More specifically, the present invention is a method for position calculation when one or more fingers are detected by an electrode grid where each electrode may have a signal corresponding to near-finger presence.

2. Description of Related Art

There are several designs for capacitance sensitive touch sensors. It is useful to examine the underlying technology to better understand how any capacitance sensitive touch sensor can be modified to work with the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Pointing object position determination is then performed by using an equation that compares the magnitude of the two signals measured.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention.

The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing.

When one or more fingers are detected by an array or grid of electrodes, each electrode may receive a signal corresponding to a portion of a finger, or near-finger presence. The prior art may use the well-known "weighted average" algorithm which produces a position for a finger.

It is important to understand the weighted average algorithm in detail in order to understand the advantages of the present invention. Therefore, an explanation of the weighted average algorithm is given. In summary, some origin is chosen, and each result in an array of results is given a weight that is proportional to a distance of the result from the origin. The weighted averages are summed, and the result is divided by an unweighted sum.

The result is a position of a finger from the origin in a selected dimension. Thus, when a touch sensor is being used that has a single dimension such as a linear array, then a single weighted average calculation may be performed in order to determine the position of the finger from the selected origin.

In the ideal "one finger" case (that is, where each result is entirely composed of a measure of near-finger presence) the weighted average algorithm performs adequately for most situations.

However, in a real world case such as when more than one finger is present, there are at least two problems with use of the weighted average algorithm that may result in inaccuracies in the position of the finger or fingers. The first problem is noise. In practice, position results may be very inaccurate if some random noise error is measured and stored in the results. This is because an error in the measurements that indicates that a finger is present at a location on the touch sensor that is far from the actual finger position will be weighted disproportionately large in the calculated weighted average position. Accordingly, it would be an advantage over the prior art to be able to minimize the effect of random noise that produces inaccurate results.

While it may be more intuitively obvious that noise that occurs far from an actual location of a finger may produce inaccurate position results, noise that occurs near an edge of a finger also causes problems. When the noise occurs near the edge of the finger, it is impossible to know what portion of a measured signal is due to the noise and what part of the measured signal is due to a valid position signal. Accordingly, more accurate position measurements might be obtained if the effect of noise near the edge of a finger can be minimized.

The second problem arises in the case of multiple fingers being present on the touch sensor. When the fingers are far apart, there may be no problems with determining an accurate position of each finger. However, when two or more fingers get near to each other when being measured, some position measurements include a signal from the finger that is not being measured. The position measurements for both fingers now include some signal from the other finger. Just as with noise, using the prior art average weight algorithm, it is impossible to know what portion of a given result is from each finger, and dividing or clipping the results gives position error and jitter in a non-continuous way.

Accordingly, it would be an advantage over the prior art to be able to exclude noise that is far from a finger, minimize the impact of noise that is measured nearer to a finger, and to be able to minimize the effect of a finger that is near a finger whose position is being measured.

BRIEF SUMMARY OF THE INVENTION

In a preferred embodiment, the present invention is a method for single and multi-finger extraction and position calculation using weighted masks for each finger, the masks for each finger being calculated using the previous position of each finger, and when the measured results overlap, the results are apportioned according to the masks such that each position result is scaled according to its mask, and scaled by its mask divided by the sum of all overlapping masks.

These and other objects, features, advantages and alternative aspects of the present invention will become apparent to those skilled in the art from a consideration of the following detailed description taken in combination with the accompanying drawings.

BRIEF DESCRIPTION OF THE SEVERAL VIEWS OF THE DRAWINGS

FIG. 5 is a spreadsheet that is provided to demonstrate a first embodiment of the present invention in one dimension.

FIG. 10 is provided as a spreadsheet showing the calculations that are performed for two fingers that have overlapping position results as detected by the touch sensor 30.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

It should be understood that use of the term "touch sensors" throughout this document may include any capacitive touch sensor device, including touchpads, touch screens and touch panels.

A detailed comparison with the weight average algorithm is useful to demonstrate the advantages of a first embodiment. It should be understood that the first embodiment may be applied to one or more dimensions of a touch sensor.

Figure 1:
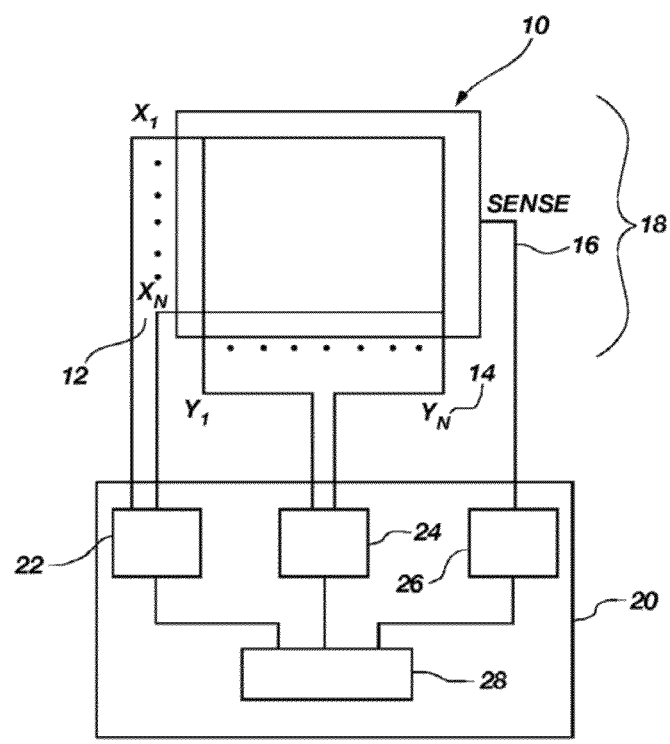
FIG. 1 is a block diagram of the components of a capacitance-sensitive touch sensor as made by CIRQUE® Corporation and which can be operated in accordance with the principles of the present invention.
Figure 2:
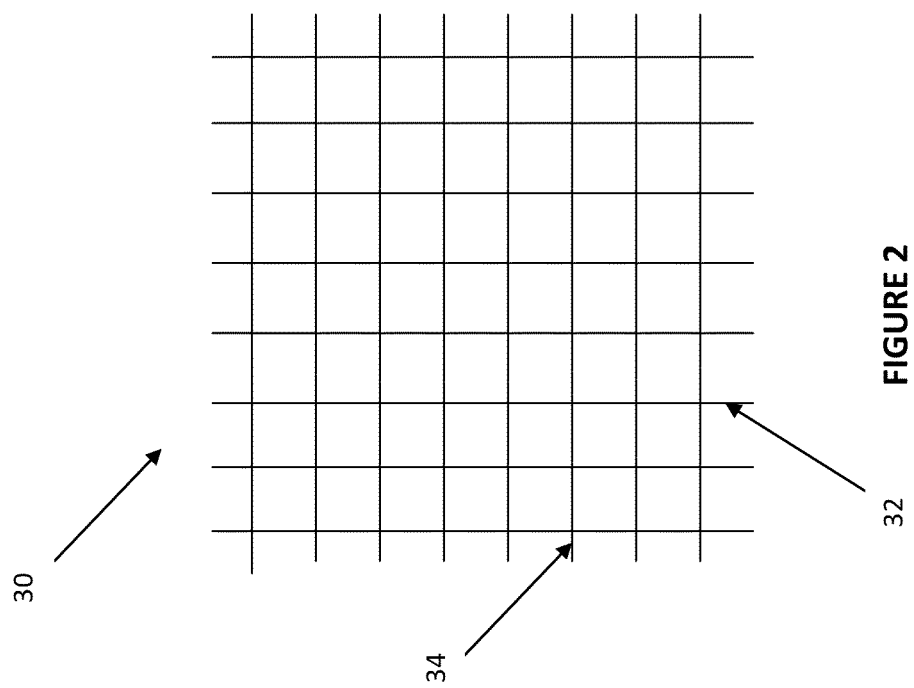
FIG. 2 is a top view of an 8×8 electrode array.

FIG. 2 is a top view of a touch sensor 30 comprised of eight X electrodes 32 and eight Y electrodes 34. The number of X and Y electrodes 32, 34 is not relevant and is for illustration purposes only.

Figure 3:
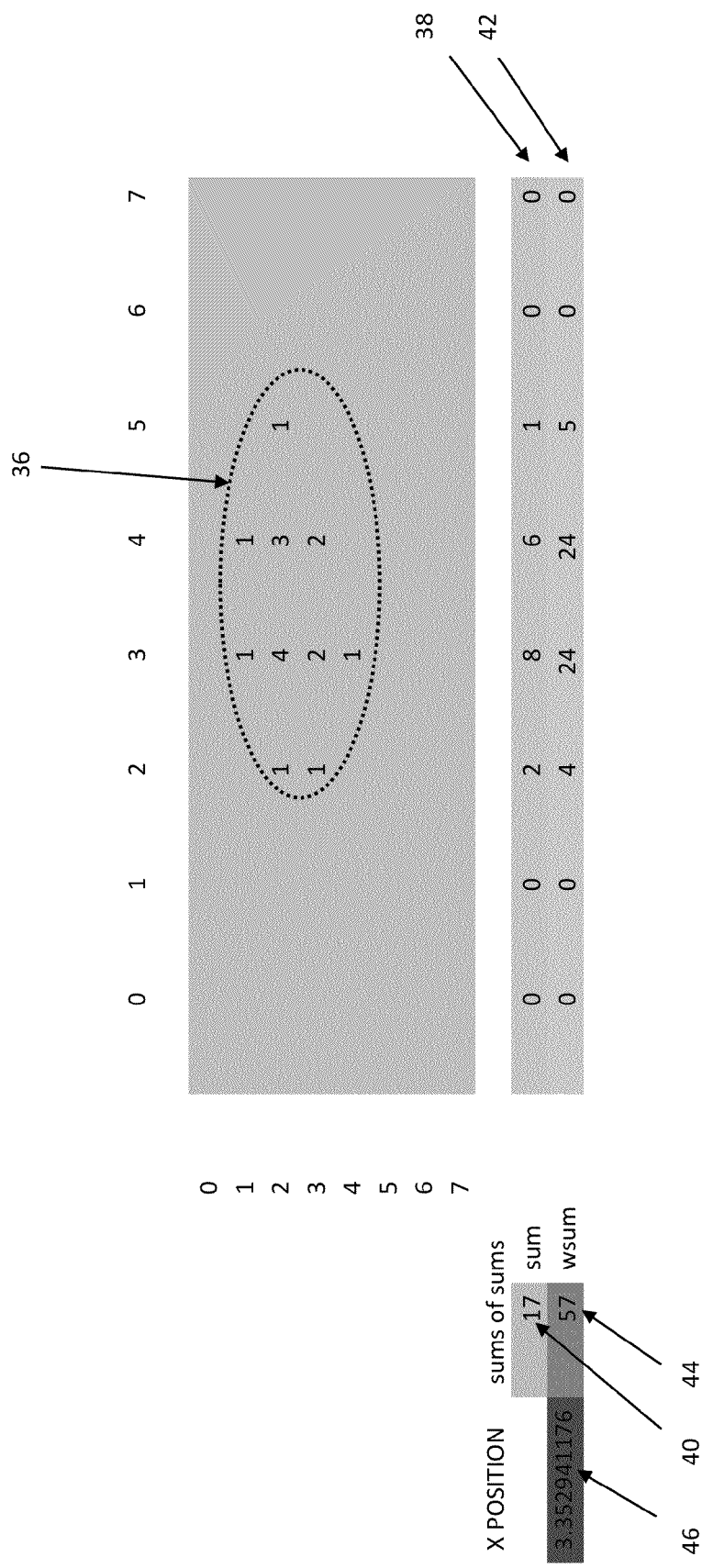
FIG. 3 is a spreadsheet that represents signals being measured on the two dimensional touch sensor 30.

FIG. 3 is a spreadsheet that represents signals being measured on the two dimensional touch sensor 30. The touch sensor 30 may determine a position of an object, such as a finger, in two dimensions using the weighted average algorithm which operates as follows in the X dimension.

Using the X electrodes 32 only, a signal strength is stored in a position corresponding to a measured value. Thus a finger is detected roughly to be within the area designated by the ellipse 36.

The first step is to calculate partial sums for each column as shown in line 38. The partial sums are then added together to find the total contact strength of the finger as shown in position 40. To determine a position of the finger in the X dimension, column sums are weighted according to their distance from an X origin, by a count of X electrodes 32. In other words, each partial sum is multiplied by the electrode number to obtain a weighted sum for each column as shown in line 42. The weighted sum for each column is then determined by adding together all of the weighted column sums as shown in position 44.

The position of the finger 36 in the X dimension is the weighted sum 44 divided by the total contact strength 40 and shown in position 46. The X position of approximately 3.35 is fairly accurate without noise.

Figure 4:
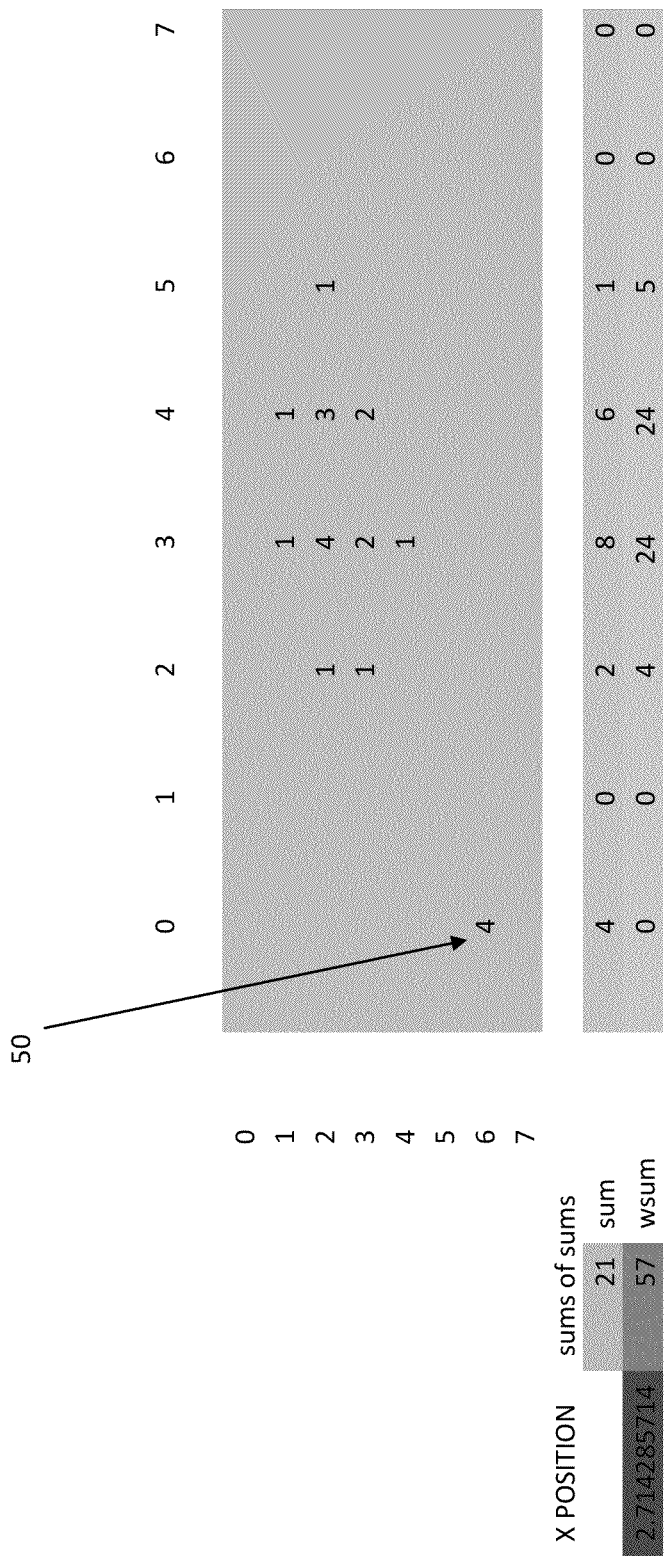
FIG. 4 is a spreadsheet that is provided to demonstrate some shortcomings of the weighted average algorithm.

FIG. 4 is a spreadsheet that is provided to demonstrate some shortcomings of the weighted average algorithm. For example, FIG. 4 shows that the introduction of noise at position 50 results in calculated position of the finger 36 in the X dimension of 2.71, which is substantially different from the actual position of 3.35. Thus it is easy to recognize the problem created by noise at a distance. While noise that is on the edge of the finger 36 will not cause such a drastic change in position, the accuracy of the position is still compromised, and may result in a jumping cursor or other manifestation of an inaccurate position.

FIG. 5 is a spreadsheet that is provided to demonstrate a first embodiment of the present invention in one dimension. It should be understood that the principles demonstrated for one dimension are applicable to any number of dimensions. It should also be recognized that there are 16 X electrodes in this example, and that the number of electrodes is not relevant. However, using a greater number of electrodes is useful to illustrate certain aspects of the present invention.

Figure 6:
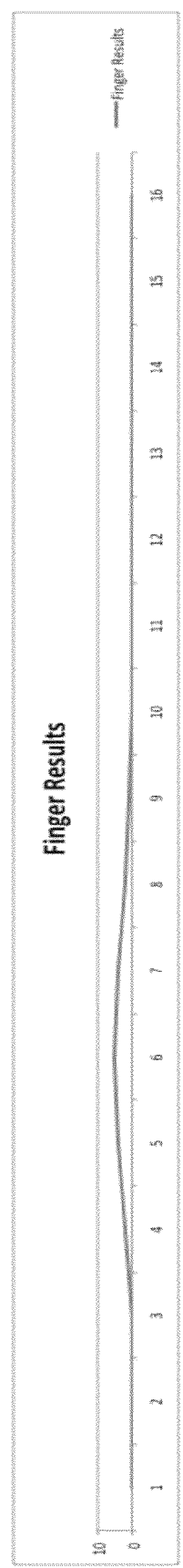
FIG. 6 is a graph that illustrates the X position data from the spreadsheet in FIG. 5.

The position of the finger in the X dimension as calculated by the weighted average algorithm is 5.17 as shown in FIG. 5. FIG. 6 is a graph that illustrates the X dimension position data from the spreadsheet in FIG. 5.

The first embodiment of the present invention uses a weighted mask to reduce the effects of noise and provide a smoothing function for position calculations.

In general terms, the first embodiment begins by using a position of the finger that has been previously determined. If it is a first time that a weighted mask is being generated, then the position may have been determined using the weighted average algorithm of the state of the art. Subsequent previous positions may be determined using a weighted mask or by using a newly calculated position using the weighted average algorithm.

The purpose of creating the weighted mask is to apply a function to a position calculation that enables signals that are near to a center of the finger to have a greater influence on the position calculation than signals that are generated near the edge of the finger. For example, the function may be characterized by a bell curve. The bell curve represents the weight or importance that a signal will be given relative to the distance from the center of the finger that the signal was measured. In this first embodiment, signals may decline in weight or importance the further that they occur from the center of a finger.

A bell curve goes to zero on each side, demonstrating that eventually the measured signals that are far from the center of the finger will be given no weight or influence on a position calculation. This may solve the problem shown in FIG. 4 where a stray signal drastically changed the calculated position of the finger in the X dimension. The weighted mask is therefore any desired function that gives more weight to signals that appear to be near the center of the finger and less weight to signals that are measured further away. Thus, a signal that is noise and which appears near the edge of a finger will now have much less effect on the calculated position, even when that noise is included in the position calculation, as long as the function that is selected for the weighted mask gives relatively little weight to signals near the edge of the finger.

Figure 7:
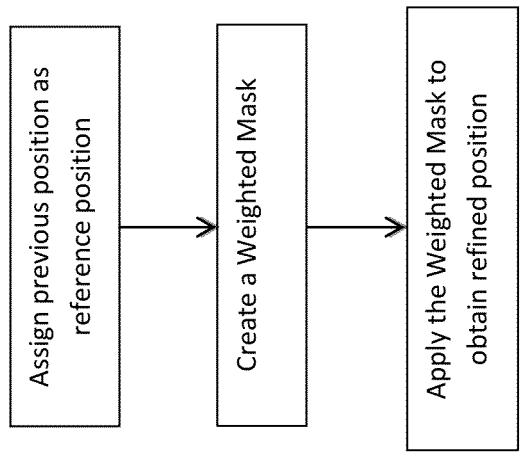
FIG. 7 is a flowchart showing the basic steps of creating a weighted mask.

FIG. 7 is a flowchart illustrating the steps of determining a position of a finger using the first embodiment of the present invention. A first step is to use a previous position of the finger, however calculated, to be used as a reference position. The second step is to create a weighted mask using the reference position data. The third step is to apply the weighted mask to the reference position data in order to allow the weighted mask to refine the position of the finger.

Figure 8:
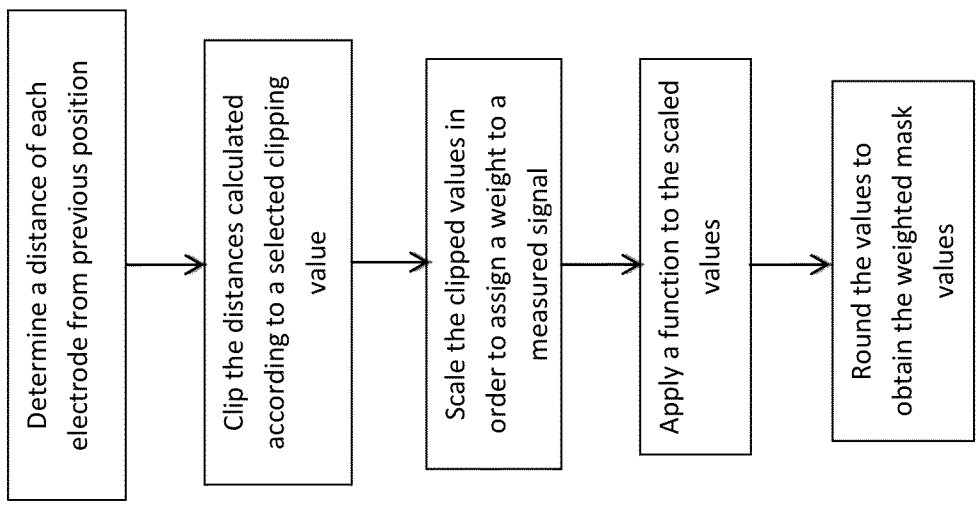
FIG. 8 is a flowchart showing more detailed steps of creating a weighted mask.

FIG. 8 provides more detail for the step of creating a weighted mask in FIG. 7. In order to create the weighted mask, the first step is to use the previous position of the finger as an estimate for the current position. For each electrode, the distance from the previous position is calculated as shown in line 60. Thus each result is given the position that would result from the weighted average calculation if that result were the only nonzero result. Based on that distance, each result is weighted inversely proportionally.

For example, the first X electrode is shown to be 5.1666667 units distant from the center of the finger, because the finger was shown to be at 5.16666667 in the weighted average calculation that is being used as the previous position. Similarly, the next X electrode is 4.1666667 units from the center of the finger, and so on. This distance calculation is made for all the electrodes in line 60. This distance calculation is going to be used to determine how much "weight" that a signal should be given based upon its distance from the center of the finger. Signals that are far from the center of the finger will be given no weight, and signals closer to the center will be given more weight.

The next step is to clip the distance values. In other words, only those electrodes within a certain distance of the center of the finger are going to be used in the creation of the weighted mask. This clipping depends upon the function that is selected for the weighted mask. In our example, a cosine squared function is being used for the weighted mask. A value of 4 has been selected as the clipping distance, so that any values beyond a distance of 4 electrodes from the center of the finger are going to be ignored or clipped at a value of 4.

A different clipping distance may be selected. The clipping distance of four units in this example is used for illustration purposes only and should not be considered a limiting factor. The clipping distance may be an integer or a decimal number.

It should also be understood that a particularly applicable mask generation function is that of cosine squared. This is because for no distance from the center of the finger, the function is equal to one. However, as the distance increases, the function smoothly goes to zero. The distance at which zero masking is desired is scaled to PI/2 and then the cosine squared function is applied. For greater distances than the clipping distance, masking is set to zero. Note that the cosine squared function is infinitely differentiable and all derivatives are continuous, meaning the function is also highly smooth. Another advantage of the cosine squared function is that the derivative evaluates to zero at both zero and PI/2 so jitter is minimized for the center and the edge of the finger.

Nevertheless, it should be understood that other functions exist with similar properties as the cosine squared function. For example, a piecewise parabolic exhibits all of these attributes subject to some desired precision. Therefore, selection of the cosine squared function for the weighted mask should not be considered as a limiting factor of the scope of the invention.

The next step is to scale the clipped distance values. As explained above, when using the cosine squared function, the values are scaled by PI/2 in order to assign a weight to the values. For example for the first electrode, the first scaled value is the clipped value multiplied by PI/2, divided by the clipping value (in this case 4), which is equal to 1.5707963. The second scaled value for the second electrode is the same because the clipped value is 4 for both. However, for the third electrode, the scaled value is 1.2435471. Scaling is repeated for all the clipped values for each electrode based on the distance from the center of the finger.

The next step is to now apply the cosine squared function to the scaled values. These values are then rounded as a matter of convenience so that the values of the weighted mask are usable. A quick look at the rounded values now illustrates the concept of the weighted mask. For example, the sixth electrode having the index value of 5 is very close to the previously calculated position of the finger of 5.16666667. The weighted mask value of the sixth electrode is 0.996, meaning that the signal from the sixth electrode is going to be weighted very highly. In contrast, the signal on the third electrode on the edge of the finger signal will only have its signal weighted at a fraction of the signal from the sixth electrode, or 0.103.

Figure 9:
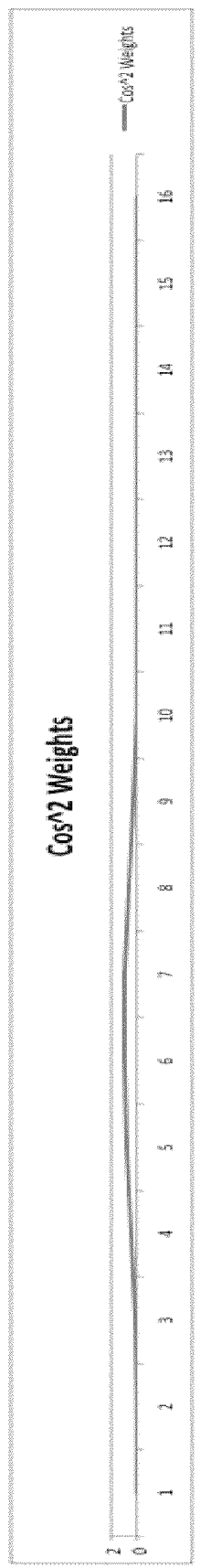
FIG. 9 is provided to illustrate the weighted mask of the cosine squared function as calculated in FIG. 5.

FIG. 9 is provided to illustrate the weighted mask of the cosine squared function as calculated in FIG. 5.

1) In more precise terms, the steps of FIG. 8 are described as follows. The first step is selecting a maximum distance value that a signal will be considered as valid from a center of the reference position. The next step is to create a first array that records a distance of each electrode from the reference position. A second array is used to record a clipped signal value for each of the electrodes, wherein the clipped signal value is equal to the distance of an electrode from the reference position if the distance is less than the maximum distance value, or it is equal to the maximum distance value if the distance of the electrode is greater than the maximum distance value. The next step is to scale each value in the second array to obtain a third array. A function is then applied to each value in the third array to obtain a fourth array. Finally, each value is rounded in the fourth array to obtain a fifth array that defines the weighted mask that may be used to obtain the refined position of the single object.

The steps for determining position are then the same steps as used in the average weighted algorithm. Thus, the rounded values are multiplied by the electrode number to obtain a partial sums result as shown in line 62. The weighted column sums result is then calculated in line 64.

The final step is to then divide the weighted column sums result by the partial sums result to obtain the refined position using the weighted mask, which is shown to be 5.105744577. This refined position will be close to and more accurate than the previously determined position of 5.16666667.

Using the steps described above to obtain a weighted mask, for each current result there is now a weight corresponding to its distance. In other words, results that are closer to the center of the finger are "weighted" more heavily as being relevant to a position determination, and results that are farther away are now given less "weight". This relative "weighting" of values is applied to results to obtain the rounded weighted mask results for each electrode, before they are used in the weighted and unweighted sums that are being used in the position calculation. The weighted mask has the characteristic that full weighting is applied to results that are close to the finger, and results that are far from the finger have no weighting applied.

The weighted mask tends to match the shape of the results obtained from an actual finger measurement. A large mismatch in shape and size can be tolerated while still achieving the desired results. For a single finger which is symmetric over the measured axes, it is sufficient that the weighted mask is also symmetric for there to be no absolute position error.

Smoothness in the shape of the mask is beneficial so that a small delta in the positioning of the mask versus the finger never results in a large change in position. In practice the weighted mask is used with a moving finger, and there is some latency in the previous to current position. A smooth weighted mask causes the position to catch up smoothly.

It was indicated earlier that the weighted mask is useful in reducing the effect of noise on position determination of a single finger. However, the present invention may also be applied when two or more fingers are present and come close together. When two fingers come close to each other, the weighted masks may overlap. The second embodiment is therefore applied to determine the position of objects that are close enough so that weighted masks are overlapping.

The weighted masks for each finger are calculated just as before, using the previous position of each finger. For results where there is no overlap of nonzero weights in the weighted masks, the algorithm described above for a single finger is unchanged. However, for results which overlap, the results are apportioned according to the masks. Each result is still scaled according to its mask, but it is also scaled by its mask divided by the sum of all overlapping masks. Note that this apportioning is done "result by result" according to the respective mask elements so some results are apportioned entirely to one finger, some results are divided roughly evenly when mask elements are about the same, and some results are ignored if they are zero in all the masks.

Again, it is beneficial that the masks be smooth to avoid position jumps for small changes in weighted mask position. Better matching of the shape and sizes of the weighted masks to the fingers results in more accurate position calculations, but it is not necessary for the weighted masks to match perfectly in order to obtain accurate results.

Note that using the previous position to locate the mask relative to the current results is implicitly exponentially filtering. This filtering reduces jitter, and this is in addition to the jitter reduction which results from ignoring results outside of the mask. This filtering increases latency which can be reduced simply by applying the algorithm one or more additional times feeding the resulting position forward to calculate a more current weighted mask.

Figure 10:
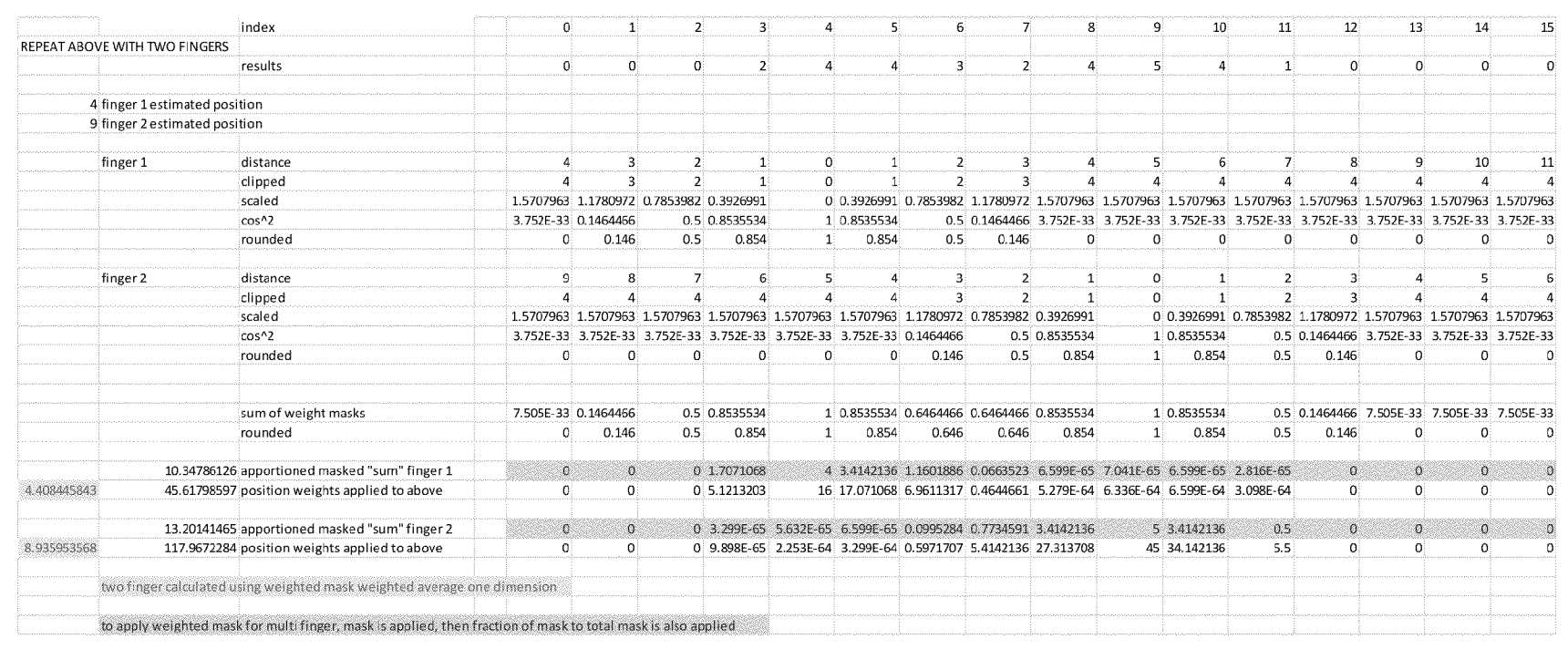

Turning now to a specific example of two fingers that are close together and have positions that are detectable by common electrodes, FIG. 10 is provided as a spreadsheet showing the calculations that are performed.

Figure 11:
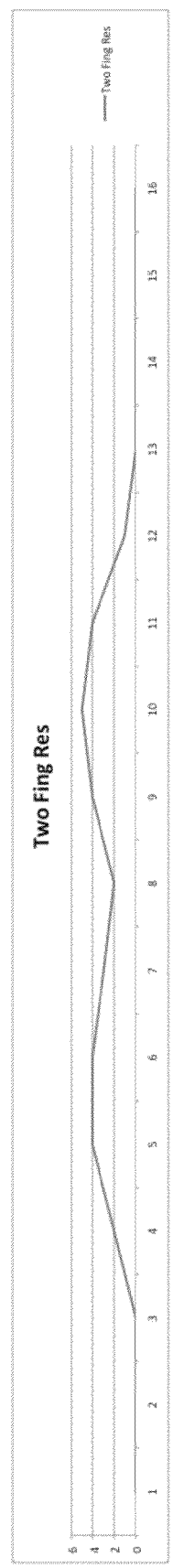
FIG. 11 is a graph of the measured position results for the two fingers.

For this example, it is assumed that the first finger is at electrode 4, and that the second finger is at electrode 9. The measured results are shown under the index of the electrodes, and shown as a graph in FIG. 11.

Figure 12:
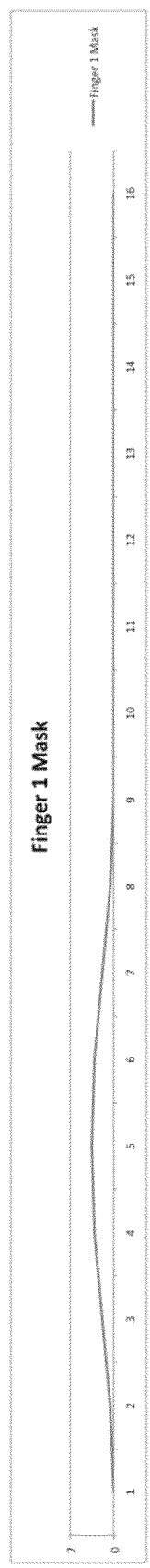
FIG. 12 is a graph of the weighted mask that is calculated for the first finger.
Figure 13:
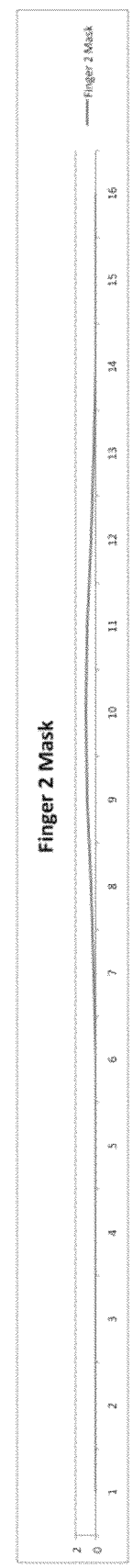
FIG. 13 is a graph of the weighted mask that is calculated for the second finger.

The steps for creating the weighted mask and then applying it are the same as given above for a single finger. FIG. 12 is a graph of the weighted mask for the first finger. FIG. 13 is a graph of the weighted mask that is calculated for the second finger.

The first difference in the steps is that after the rounded values are determined, a sum of weighted masks is calculated for each electrode, and then rounded.

The partial sums row or apportioned masked "sum" for each finger is calculated by multiplying the electrode number by the cosine squared function which is also multiplied by the cosine squared function divided by the sum of weighted masks. These values are summed to obtain the total strength of the finger which is shown as 10.34786126 for the first finger.

The next step is to multiply the apportioned masked sums by the electrode to obtained position weights. These are then summed to obtain the weighted sum of 45.61798597 of the first finger.

The position of the first finger is then found by dividing the weighted and apportioned sum by the total strength of the first finger to obtain a position of 4.408445843.

The steps are repeated for the second finger to obtain a position of 8.935953568 in the X dimension.

Figure 14:
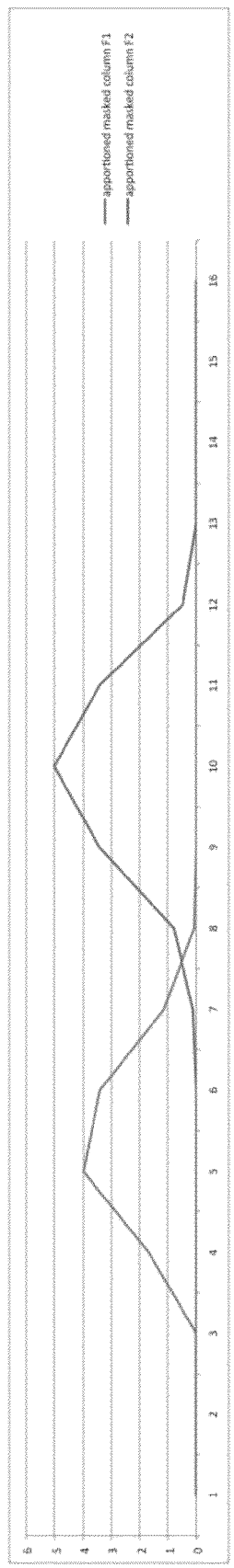
FIG. 14 is a graph showing the apportioned weighted masks for the first and second fingers.

FIG. 14 is a graph showing the apportioned weighted masks for the first and second fingers.

1) A more precise description of the steps is as follows. The first step is to select a maximum distance value that a signal will be considered as valid from a center of the first object reference position, and to then create a first object first array that records a distance of each electrode from the first object reference position. A first object second array is then created to record a clipped signal value for each of the electrodes, the clipped signal value being equal to the distance of an electrode from the first object reference position if the distance is less than the maximum distance value, or equal to maximum distance value if the distance of the electrode is greater than the maximum distance value. The next step is to scale each value in the first object second array to obtain a first object third array. A function is then applied to each value in the first object third array to obtain a first object fourth array. These values are rounded in the first object fourth array to obtain a first object fifth array that defines the weighted mask that may be used to obtain the first object refined position. The same steps are performed for the second object or finger.

The next step is to obtain the refined position for each object using apportioned masks. The first step is to add the first object fourth array and the second object fourth array to create a sum of weighted masks array. The next step is to multiply each electrode index value by a corresponding value in the first object fifth array, and then multiplying by the value in the first object fifth array divided by the value in the sum of weighted masks array to thereby apply the first object weighted mask in a first object sixth array.

The next step is to sum all the values in the first object sixth array to obtain a first object total strength of signal value that is apportioned by an overlapping mask. Each value in the first object sixth array is multiplied by a corresponding electrode index value to obtain a weighted first object seventh array. The next step is to add all the values in the first object seventh array to obtain a first object total weighted strength of signal value that is apportioned by an overlapping mask. The final step is to divide the first object total weighted strength of signal value by the first object total strength of signal value to obtain the first object refined position in the second dimension.

These same steps are repeated for the second object to obtain a refined position.

It should be understood that a previous position calculation may not used as the basis for creating the weighted mask position. Instead an estimate of a position is derived from current results obtained from the average weighted algorithm. The weighted mask algorithm is then applied one or more times to simply refine the position.

It should also be understood that the present invention is not limited to reducing noise and more precisely determining a position of just one or two fingers. The principles of the present invention may be applied to three or more fingers. Whenever masks overlap, then the masks must be apportioned to account for the overlap.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for refining a position of a single object on a touch sensor, said method comprising:
   1) providing a touch sensor comprised of a two dimensional grid of electrodes, each of the electrodes in each dimension assigned an index value from zero to a highest index value;
   2) determining a position of the single object in a first dimension of the grid of electrodes as a reference position using a signal obtained from the grid of electrodes;
   3) creating a first weighted mask using the reference position; and
   4) applying the first weighted mask to obtain a refined position of the single object in the first dimension, wherein the first weighted mask is obtained through the steps of:
      selecting a maximum distance value that a signal will be considered as valid from a center of the reference position;
      creating a first array that records a distance of each electrode from the reference position;
      creating a second array that records a clipped signal value for each of the electrodes, the clipped signal value being equal to the distance of an electrode from the reference position if the distance is less than the maximum distance value, or equal to maximum distance value if the distance of the electrode is greater than the maximum distance value;
      scaling each value in the second array to obtain a third array;
      applying a function to each value in the third array to obtain a fourth array; and
      rounding each value in the fourth array to obtain a fifth array that defines the weighted mask that may be used to obtain the refined position of the single object.

2. The method as defined in claim 1 wherein the method further comprises:
   1) determining a position of the single object in a second dimension relative to the grid of electrodes as a reference position;
   2) creating a second weighted mask using the reference position; and
   3) applying the second weighted mask to obtain a refined position of the single object in the second dimension.

3. The method as defined in claim 1 wherein the function that is applied to each value in the third array is a cosine square function.

4. The method as defined in claim 1 wherein the method further comprises obtaining the refined position for the at least one object by:
   1) multiplying each electrode index value by a corresponding value in the fifth array to thereby apply the weighted mask in a sixth array;
   2) summing all the values in the sixth array to obtain a total strength of signal value;
   3) multiplying each value in the sixth array by a corresponding electrode index value to obtain a weighted seventh array;
   4) summing all the values in the seventh array to obtain a total weighted strength of signal value; and
   5) dividing the total weighted strength of signal value by the total strength of signal value to obtain the refined position in the first dimension.

5. A method for determining a position of at least one object on a touch sensor that reduces the effect of noise in a position calculation, said method comprising:
   1) providing a touch sensor comprised of a two dimensional grid of electrodes, each of the electrodes in each dimension assigned an index value from zero to a highest index value;
   2) determining a position of the at least one object in a first dimension of the grid of electrodes as a reference position using a signal obtained from the grid of electrodes;
   3) creating a first weighted mask using the reference position, the first weighted mask clipping signals used to create the first weighted mask in order to exclude noise signals beyond a selected distance from the reference position, and reducing a weight given to signals that are included but which occur farther from the reference position; and
   4) applying the first weighted mask to obtain a refined position of the at least one object in the first dimension.

6. A method for refining a position of two objects on a touch sensor, said method comprising:
   1) providing a touch sensor comprised of a two dimensional grid of electrodes, each of the electrodes in each dimension assigned an index value from zero to a highest index value;
   2) determining a position of the two objects in a first dimension of the grid of electrodes as a first object reference position and a second object reference position using a signal obtained from the grid of electrodes;

3) creating a first object weighted mask using the first object reference position and creating a second object weighted mask using the second object reference position; and
4) applying the first object weighted mask to obtain a refined first object position in the first dimension, and applying the second object weighted mask to obtain a refined second object position in the first dimension.

7. The method as defined in claim 6 wherein the method further comprises:
   1) determining a position of the two objects in a second dimension relative to the grid of electrodes as a first object reference position and a second object reference position;
   2) creating a first object weighted mask using the first object reference position in the second dimension and creating a second object weighted mask using the second object reference position in the second dimension; and
   3) applying the first object weighted mask to obtain a refined first object position in the second dimension, and applying the second object weighted mask to obtain a refined second object position in the second dimension.

8. The method as defined in claim 6 wherein the method further comprises reducing noise in the first object refined position and compensating for overlapping weighted masks when they occur by:
   1) selecting a maximum distance value that a signal will be considered as valid from a center of the first object reference position; and
   2) creating a first object first array that records a distance of each electrode from the first object reference position;
   3) creating a first object second array that records a clipped signal value for each of the electrodes, the clipped signal value being equal to the distance of an electrode from the first object reference position if the distance is less than the maximum distance value, or equal to maximum distance value if the distance of the electrode is greater than the maximum distance value;
   4) scaling each value in the first object second array to obtain a first object third array;
   5) applying a function to each value in the first object third array to obtain a first object fourth array; and
   6) rounding each value in the first object fourth array to obtain a first object fifth array that defines the weighted mask that may be used to obtain the first object refined position.

9. The method as defined in claim 8 wherein the function that is applied to each value in the first object third array is a cosine squared function.

10. The method as defined in claim 8 wherein the method further comprises reducing noise in the second object refined position and compensating for overlapping weighted masks when they occur by:
    1) selecting a maximum distance value that a signal will be considered as valid from a center of the second object reference position; and
    2) creating a second object first array that records a distance of each electrode from the second object reference position;
    3) creating a second object second array that records a clipped signal value for each of the electrodes, the clipped signal value being equal to the distance of an electrode from the second object reference position if the distance is less than the maximum distance value, or equal to maximum distance value if the distance of the electrode is greater than the maximum distance value;
    4) scaling each value in the second object second array to obtain a second object third array;
    5) applying a function to each value in the second object third array to obtain a second object fourth array; and
    6) rounding each value in the second object fourth array to obtain a second object fifth array that defines the second object weighted mask that may be used to obtain the second object refined position.

11. The method as defined in claim 10 wherein the function that is applied to each value in the second object third array is a cosine squared function.

12. The method as defined in claim 10 wherein the method further comprises obtaining the refined position for the first object by:
    1) adding the first object fourth array and the second object fourth array to create a sum of weighted masks array;
    2) multiplying each electrode index value by a corresponding value in the first object fifth array, and then multiplying by the value in the first object fifth array divided by the value in the sum of weighted masks array to thereby apply the first object weighted mask in a first object sixth array;
    3) summing all the values in the first object sixth array to obtain a first object total strength of signal value that is apportioned by an overlapping mask;
    4) multiplying each value in the first object sixth array by a corresponding electrode index value to obtain a weighted first object seventh array;
    5) summing all the values in the first object seventh array to obtain a first object total weighted strength of signal value that is apportioned by an overlapping mask; and
    6) dividing the first object total weighted strength of signal value by the first object total strength of signal value to obtain the first object refined position in the second dimension.

13. The method as defined in claim 10 wherein the method further comprises obtaining the refined position for the second object by:
    1) adding the first object fourth array and the second object fourth array to create a sum of weighted masks array;
    2) multiplying each electrode index value by a corresponding value in the second object fifth array, and then multiplying by the value in the second object fifth array divided by the value in the sum of weighted masks array to thereby apply the second object weighted mask in a second object sixth array;
    3) summing all the values in the second object sixth array to obtain a second object total strength of signal value that is apportioned by an overlapping mask;
    4) multiplying each value in the second object sixth array by a corresponding electrode index value to obtain a weighted second object seventh array;
    5) summing all the values in the second object seventh array to obtain a second object total weighted strength of signal value that is apportioned by an overlapping mask; and
    6) dividing the second object total weighted strength of signal value by the second object total strength of signal value to obtain the second object refined position in the second dimension.

* * * * *